United States Patent
Ferrario et al.

(10) Patent No.: US 7,035,362 B2
(45) Date of Patent: Apr. 25, 2006

(54) METHOD FOR CLOCK-PULSE SELECTION IN A BASEBAND COMBINER AND RELATED BASEBAND COMBINER

(75) Inventors: Morena Ferrario, Castiglione Olona (IT); Roberto Pellizzoni, Cantù (IT); Roberto Valtolina, Trezzo sull'Adda (IT); Arnaldo Spalvieri, Milan (IT)

(73) Assignee: Alcatel, Paris (FR)

( * ) Notice: Subject to any disclaimer, the term of this patent is extended or adjusted under 35 U.S.C. 154(b) by 737 days.

(21) Appl. No.: 10/090,749

(22) Filed: Mar. 6, 2002

(65) Prior Publication Data

US 2002/0163982 A1   Nov. 7, 2002

(30) Foreign Application Priority Data

Mar. 23, 2001   (IT) .......................... MI2001A0615

(51) Int. Cl.
 H04L 7/00   (2006.01)
 H04B 1/10   (2006.01)
 H04B 17/02  (2006.01)

(52) U.S. Cl. ........................ 375/355; 375/350; 455/134

(58) Field of Classification Search ................ 375/347, 375/326, 354, 316, 355, 267; 455/132–136
 See application file for complete search history.

(56) References Cited

U.S. PATENT DOCUMENTS

| | | | |
|---|---|---|---|
| 3,879,664 A * | 4/1975 | Monsen | 375/232 |
| 5,388,100 A   | 2/1995 | Ohtsuka | |
| 5,488,638 A * | 1/1996 | Kazecki et al. | 375/347 |
| 5,898,741 A * | 4/1999 | Nagashima | 375/347 |
| 5,905,767 A * | 5/1999 | Fujimura | 375/355 |
| 6,470,194 B1 * | 10/2002 | Miya et al. | 455/562.1 |
| 6,721,367 B1 * | 4/2004 | Miya et al. | 375/267 |
| 2001/0030991 A1 * | 10/2001 | Imai et al. | 375/145 |

OTHER PUBLICATIONS

Floyd M Gardner: "a BPSK/QPSK Timing-Error Detector for Sampled Receivers", IEEE Transactions on Communications, vol. COM-34, No. 5, May 1986, pp. 423-429.
Gugliemlmi F et al.: "Blind Algorithms for Joint Clock Recovery and Baseband Combining in Digital Radio" European Conference on Radio Relay Systems. Edinburgh, Oct. 11-14, 1994, London, IEE, GB, vol. CONF. 4, Oct. 11, 1993, pp. 279-286.
Patent Abstracts of Japan, vol. 016, No. 432 (E-1262), Sep. 9, 1992 & JP 04 150320 A (NEC Corp.), May 22, 1992.

* cited by examiner

*Primary Examiner*—Tesfaldet Bocure
*Assistant Examiner*—Vineeta Panwalkar
(74) *Attorney, Agent, or Firm*—Sughrue Mion, PLLC

(57) ABSTRACT

Described is a method for the clock-pulse selection in a baseband combiner of a space-diversity receiver. The method provides for driving the clock recovery circuit by means of the main signal, filtered and sampled, or by the diversity signal, filtered and sampled as well, and it is characterized by calculating the average power of the equalized main signal and the average power of the equalized diversity signal; and by driving the clock recovery circuit by means of the signal chosen according to a comparison between the average powers of the signals at the output of the equalizers. Advantageously, the invention provides for a hysteresis on the power comparison and guarantees a soft change with respect to the selection performed at the preceding time of processing.

6 Claims, 4 Drawing Sheets

METHOD FOR CLOCK-PULSE SELECTION IN A BASEBAND COMBINER AND RELATED BASEBAND COMBINER

INCORPORATION BY REFERENCE OF PRIORITY DOCUMENT

This application is based on, and claims the benefit of, Italian Patent Application No. MI2001A000615 filed on Mar. 23, 2001, which is incorporated by reference herein.

BACKGROUND OF THE INVENTION

1. Field of the Invention

The present invention generally pertains to the field of radio transmission and, more particularly, point-to-point radio link communication systems using space-diversity reception techniques. Still more in particular, it concerns a method and a baseband combiner designed for symbol synchronization in receivers performing the combination of two more space-diversity signals.

2. Description of the Prior Art

Indeed, one of the main problems affecting the free-space links is the multipath phenomenon, also known as selective fading: the receive antenna can indeed receive, along with the desired signal, a delayed replica thereof, caused by the reflection of the transmitted signal against tropospheric layers or by reflection from orographic obstacles. In addition to this corruptive phenomenon is the so-called flat fading wherein the signal available at the receiving antenna is a combination of various signals not only delayed but also possibly attenuated.

Under particularly unfavorable conditions, the fading may even bring the radio system to an outage condition, thus making the received signal no longer intelligible.

A first possible, and widely used in practice, countermeasure is represented by the adoption of an adaptive equalizer inside the demodulation equipments. This solution may at times result in being inadequate in the case of radio links particularly long or installed under particularly unfavorable geographical conditions.

An alternative system remedy commonly in use provides for the use of space-diversity reception techniques using two or more suitably spaced antennas (in the following, by way of example, but not of limitation, two antennas will be considered) in reception. The space-diversity operating principle of the system just consists in sending the same information to the receiver by means of two distinct signals (one will be called "main" and the other will be called "diversity"). The effectiveness of this method depends on the fact that, if the antennas are sufficiently spaced out vertically, the received signals can be deemed to be uncorrelated and therefore it is extremely unlikely that both signals exhibit the same quality at the same time.

Two main methods of processing the pair of received signals are known: the selection (switching) and the combination. The switching is based upon the selection ideally at any time instant, of the best of the two signals through an appropriate criterion (typically, the evaluation of the Bit Error rate, in short BER).

The approach that is considered more effective is to process the two diversity signals by suitably combining them. The architecture which is often used in the case of baseband combiner, is the one wherein the main and diversity signals, suitably sampled, form the inputs of two Fractionally Spaced Equalizers (FSE) whose output is summed and form the result of the combination.

The clock signal recovery in equipments of the aforesaid type occurs according to the known Gardner algorithm [F. M. Gardner, "A BPSK/QPSK timing error detector for sampled receivers", *IEEE Transactions on Communications*, vol. COM-34 No. 5, May 1986, pages 423–429] that utilizes the samples of the signal at T and at T/2 to provide an estimate that, after being properly filtered and integrated, then allows for recovering the correct sampling phase.

According to the known schematic of a baseband combiner of a radio link system with space-diversity reception, it is therefore a common practice to pick-up the signal at the input of the equalizer, be it of the main path rather than the diversity path, where the samples at T/2 are available. In principle, it would also be possible picking up the signal downstream the summation node where, on the other hand, both because of the demand to reduce the operating frequency of the upstream equalizers and because of the fact that the downstream decision device inherently requires the signal samples at T only, the samples at T/2 which, as said above, are essential to the Garden algorithm for the clock recovery, are not reasonably made available.

In the receive equipments having an architecture like the one described above, in order to realize the symbol synchronization in an effective manner, from which the clock signal to be utilized by the entire digital apparatus is also derived, it is then necessary to perform the clock recovery by means of a sole circuit.

In principle, it would be enough to previously fix indifferently the main or diversity signal to be inputted to the clock recovery circuit. However, this may be not enough to optimize the performances since the choice of which of the signals should be used for the clock signal recovery is decisive. Indeed, the channel conditions could particularly hinder or penalize the signal selected for synchronization with respect to the other one: in such a case the effectiveness of the whole combination, which, on the other hand should have had a different outcome if the clock recovery were caused by the less corrupted signal, would be impaired even also irremediably.

SUMMARY OF THE INVENTION

From the above, it follows that, in order to provide the best possible performances from a recovered clock reliability standpoint, an adaptive selection of the best signal at the input of the equalizers of the main and diversity paths is to be provided for.

In view of the above considerations, it is the main object of the present invention to provide a method of selecting in an adaptive manner the best signal at the input of the equalizers of the main and diversity paths, from which selected signal the clock signal could be derived.

A further object of the present invention is to provide a baseband combiner in which the best signal at the input of the equalizers of the main and diversity branches is selected in an adaptive manner, from which selected signal the clock signal is derived.

This and further objects are achieved by a method and combiner having the features set forth in the independent claims 1 and 4, respectively. Further advantageous characteristics of the method and of the combiner are set forth in the respective dependent claims. All the claims are considered to be an integral part of the present description.

The signal adaptive selection method from which to derive the symbol synchronization and the synchronization of the whole digital system in accordance with the present invention is based essentially on the execution of appropriate weighted comparisons of power estimates of the concurrent signals.

The invention will certainly result in being clear in view of the following detailed description, merely given by way of example and not of limitation and to be read with reference to the annexed figures.

BEST MODE FOR CARRYING OUT THE INVENTION

Figure 1:
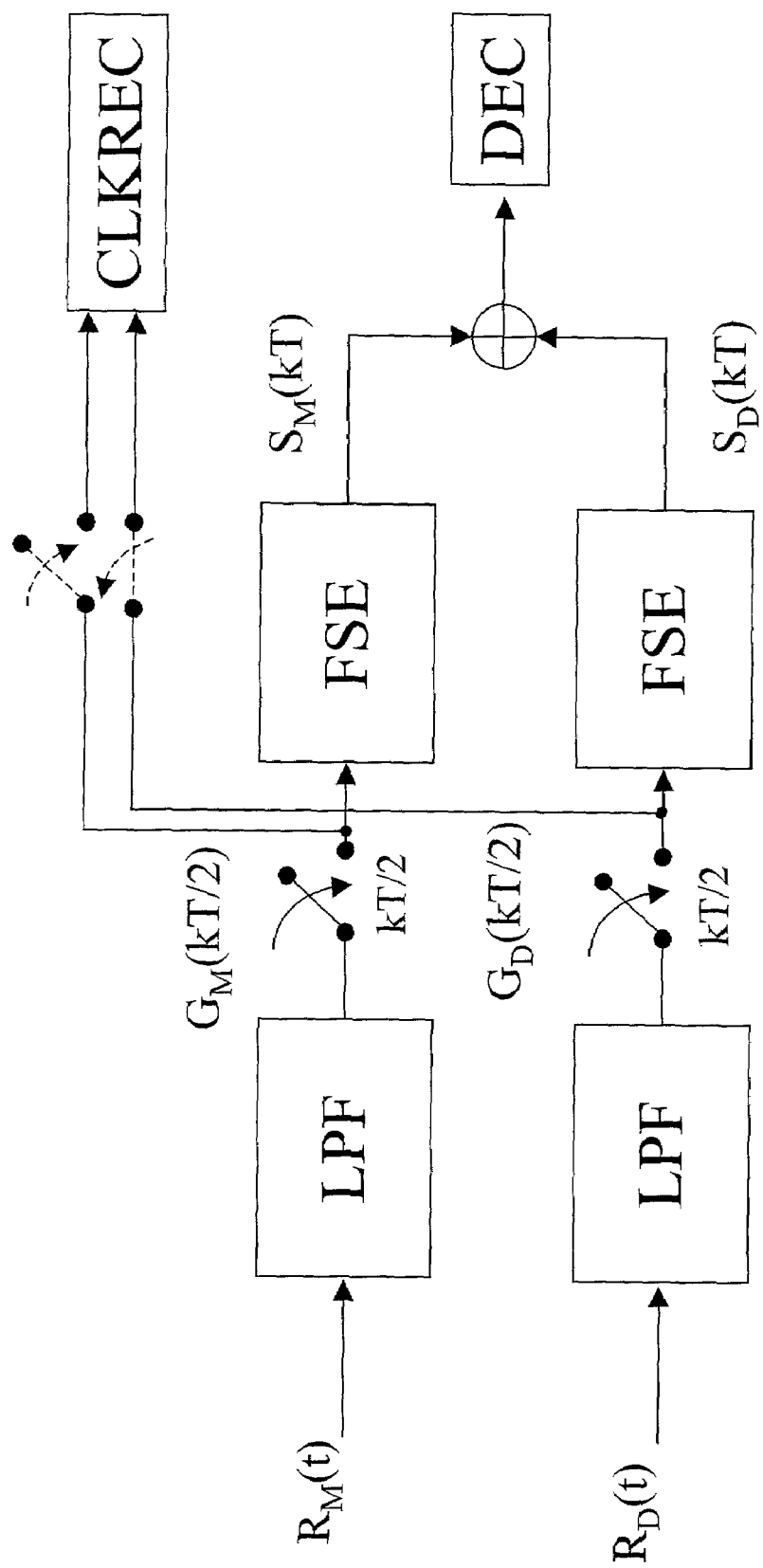
FIG. 1 is a basic diagram of a baseband combiner for space-diversity reception system.

In FIG. 1, as said above, there is illustrated a baseband combiner for a space-diversity reception system that processes the two (main and diversity) signals coming from two respective antennas and combines them properly. The two, main and diversity, signals ($R_M(t)$, $R_D(t)$) are low pass filtered (LPF); each of them is then passed through an Analog-to-Digital Converter (A/D) for the sampling, at the output of which converter are the signals $G_M(kT/2)$, $G_D(kT/2)$, and through a Fractionally Spaced Equalizer (FSE). By way of example and not of limitation, the Fractionally Spaced Equalizer will be assumed as T/2 spaced, T being the signaling interval. The outputs of the equalizers ($S_M(kT)$, $S_D(kT)$) are then summed and substantially form the result of the combination.

Figure 2:
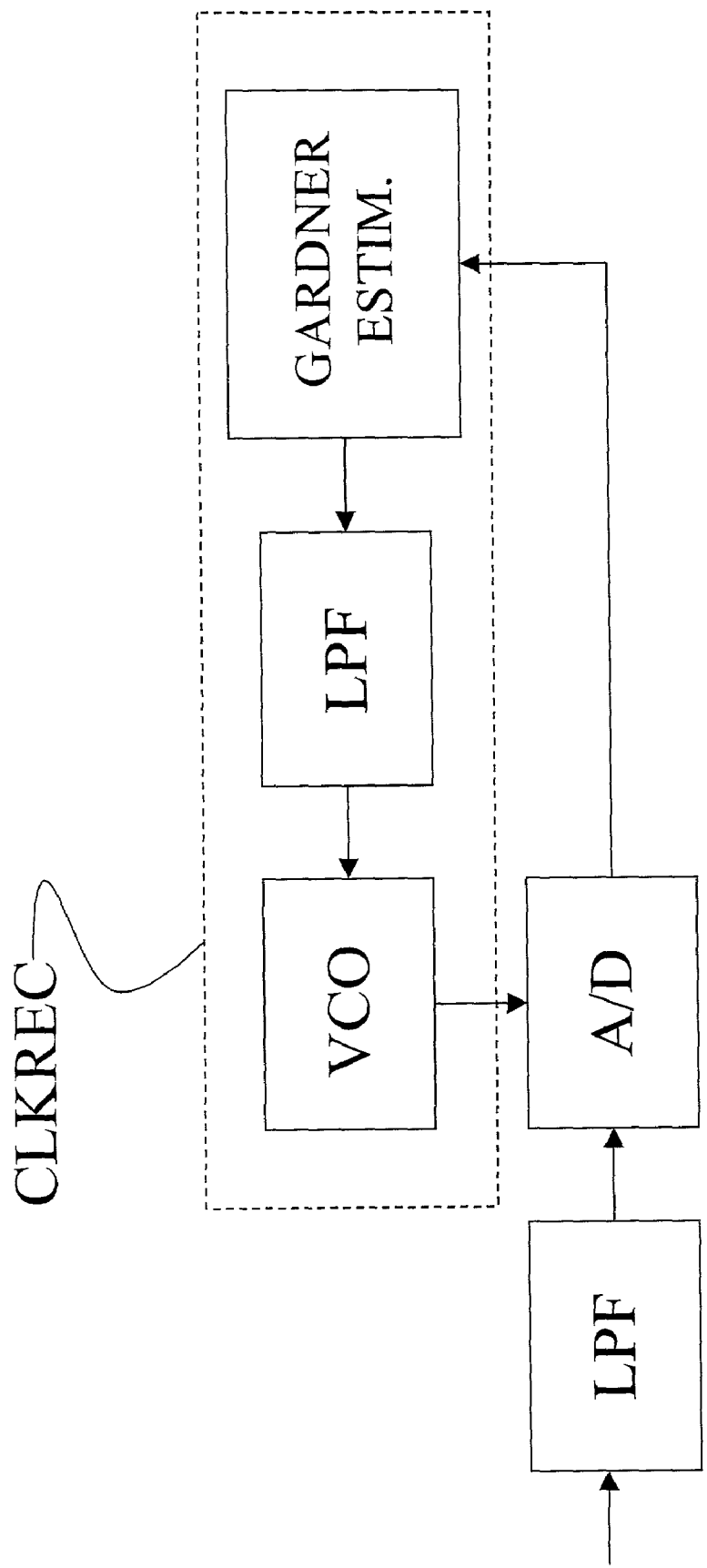
FIG. 2 is a basic diagram of a clock recovery circuit.

The clock recovery (CLKREC) is performed according to the aforementioned Gardner algorithm that uses the samples at T and at T/2 to provide an estimate that, properly filtered and integrated, then permits of recovering the correct sampling phase. In FIG. 2 there is reproduced a conventional diagram of the clock recovery based upon the Gardner algorithm in which VCO denotes a Voltage-Controlled Oscillator and A/D denotes an Analog-to-Digital converter.

According to the diagram of FIG. 1, the signal is picked up at the input of the equalizer, both on the main and on the diversity paths, where the samples at T/2 are available.

To realize, instead, in an effective manner the symbol synchronization, with reference to the basic diagram of FIG. 1, from which the clock utilized by the entire digital equipment also derives, it is then necessary to realize the clock recovery by means of a sole circuit.

It is not deemed as convenient to set in advance the signal, main or diversity ($G_M(kT/2)$, $G_D(kT/2)$), to be input to the clock recovery circuit. The channel conditions indeed could particularly hinder or penalize the signal selected for the synchronization in comparison with the other: in such a case the effectiveness of the whole combination would be impaired, even also irremediably. If, instead, the other signal (that has proved to be less corrupted) had been chosen for the clock recovery, the combination would have had a different result.

From a point of view of recovered-clock reliability, the present invention contemplates an adaptive selection of the best signal at the input of the equalizers of the main and diversity paths.

The present invention proposes the adaptive selection of the signal from which to derive the synchronization on the basis of a power estimation that permits of discriminating, which signal among the signals that are available in reception, has suffered less degradation because of the free-space propagation. In other words, in a first approximation, it could be assumed to be able to evaluate the status of a signal according to the average power thereof at the output of the related equalizer; the higher the power, the best the status of the signal: in order to obtain the best possible combination, the equalizer will indeed improve the signal which is in the best conditions and attenuate, instead, the more corrupted one.

Figure 3:
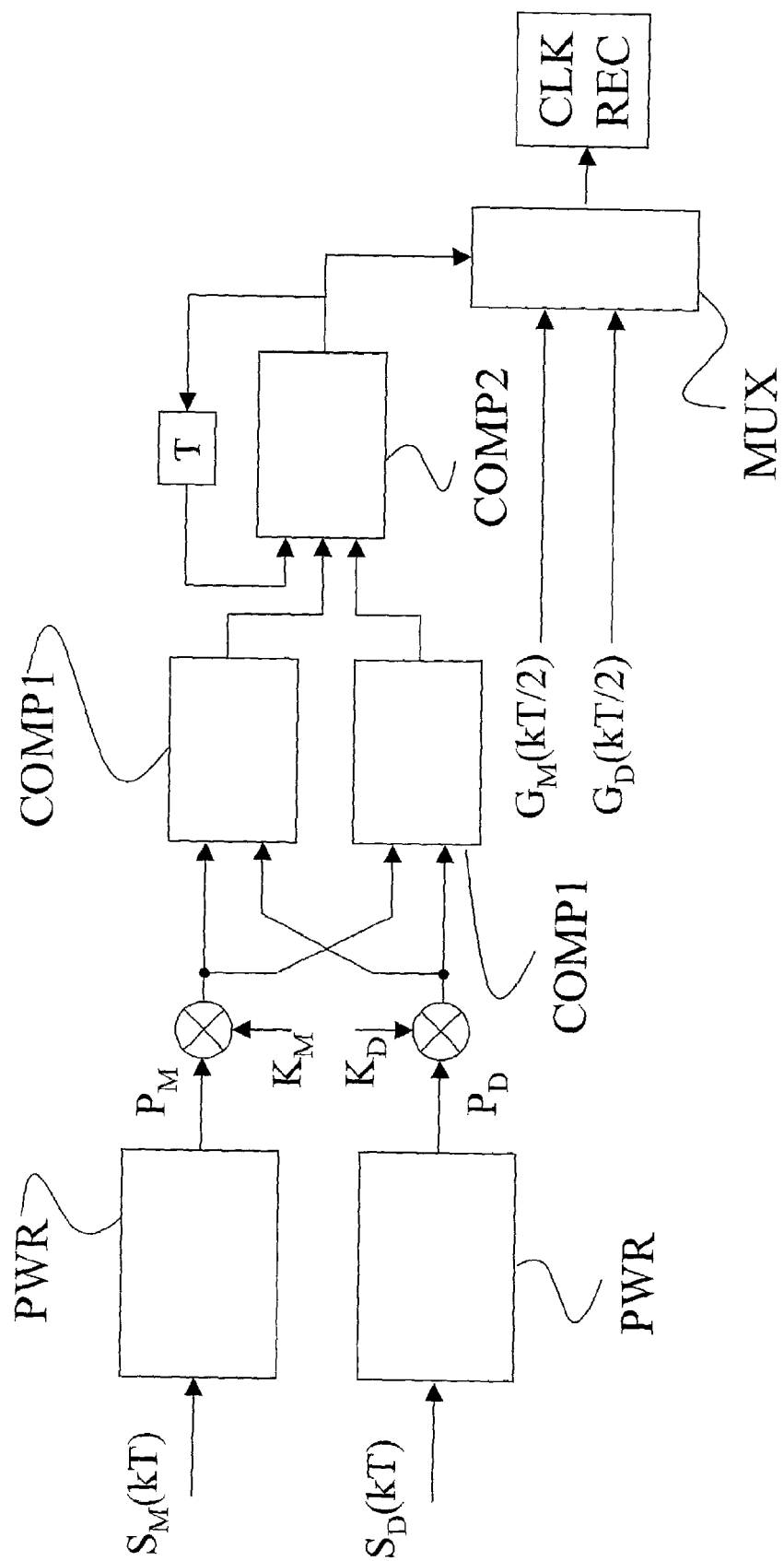
FIG. 3 shows the diagram for the calculation and the comparison of the powers that the method according to the present invention requires to calculate.

With reference to FIGS. 1 and 3, consider the samples of the two signals $S_M(kT)$ and $S_D(kT)$ at the output of the two equalizers respectively on the main (M) and diversity (D) paths. Further, please consider the corresponding average power of these signals, being defined as:

$$P_i = E\{|S_i(kT)|^2\} \quad i = D, M$$

having denoted by $E\{\cdot\}$ the expected value operation (in FIG. 3, the block that calculates such an average power is labeled PWR). Then the average power is operatively obtained by a sample estimation operation:

$$P_i = \frac{1}{N}\sum_{k=0}^{N-1} |S_i(kT)|^2 \quad i = D, M$$

N being a positive integer indicating the length of the computation window utilized.

In principle, the clock recovery signal selection could occur according to the following simple rule: if $P_D > P_M$ then the signal to be selected for the synchronization (the one for driving the CLKREC) will be the one at the input of the equalizer of the diversity path (D), otherwise the other one (M). This logic, as said, is applicable only in principle since, should the difference between the two power estimates be close to zero, this case being, on the other hand, frequent in practice when the signals on the main and diversity paths are not particularly degraded by the channel, there would be a continuous almost random switch of the selection without resulting in advantages from the performance standpoint.

The present invention, just to prevent the occurrence of said situation, proposes first a more sophisticated selection logic that introduces a hysterisis on the comparison of the powers. Moreover, according to the present invention, a soft change with respect to the selection performed at the preceding time processing is also provided.

Figure 4:
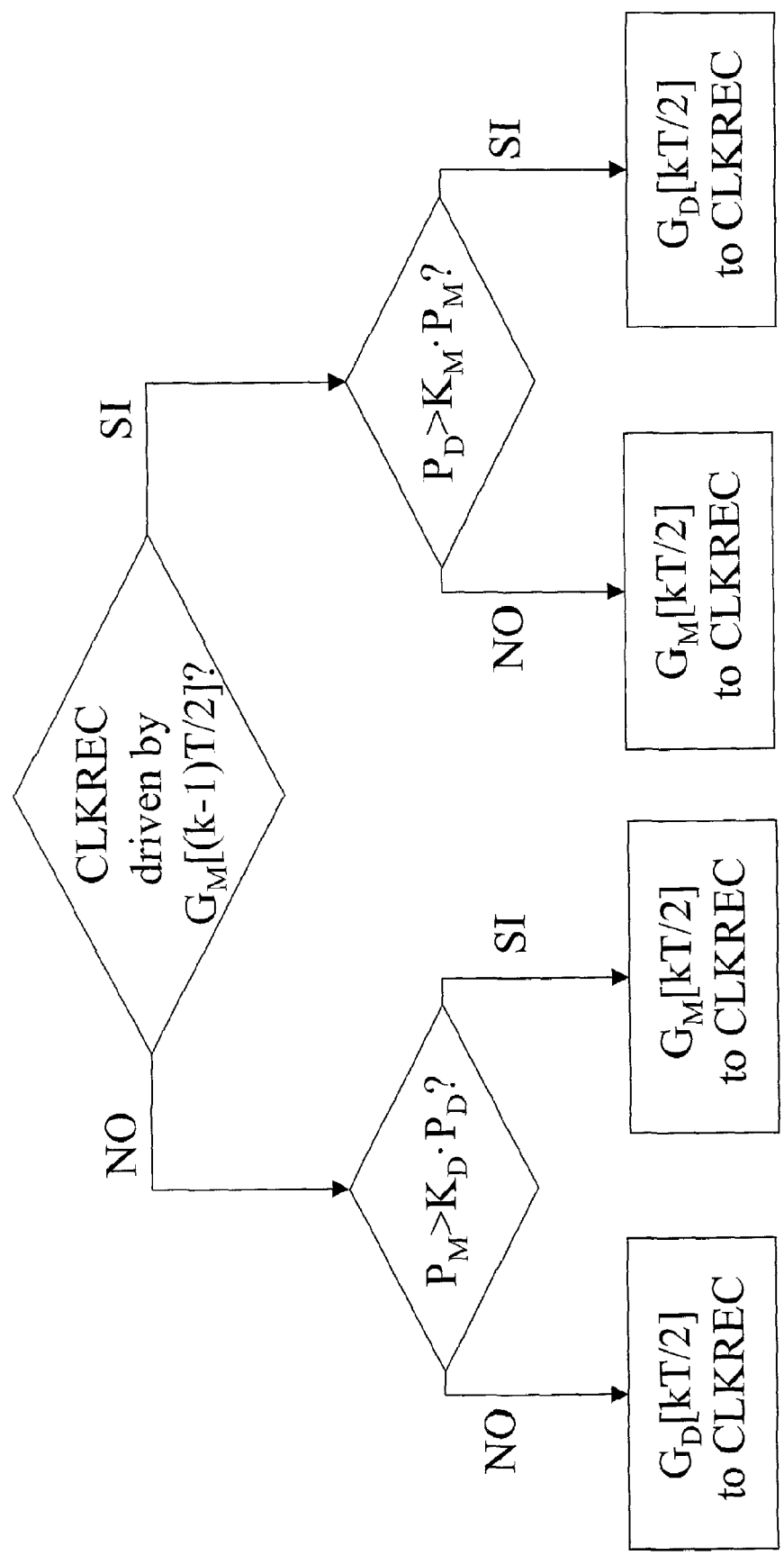
FIG. 4 reproduces the flow diagram of the selection logic according to the present invention.

With reference to FIGS. 3 and 4, the logic of the selection algorithm in accordance with the present invention may therefore be summarized according to the following rules: if, at the preceding time of processing, the signal that was driving the clock circuit was the Main one, $G_M[(k-1)T/2]$, then the diversity signal $G_D(kT/2)$ is selected if and only if $P_D > K_M \cdot P_M$, $K_M$ being a positive constant suitably calibrated to perform the necessary hystrerisis; conversely, if at the preceding time of processing the signal that was driving the clock circuit was the diversity one, $G_D[(k-1)T/2]$, then the main signal $G_M(kT/2)$ is selected if and only if $P_M > K_D \cdot P_D$, $K_D$ being a positive constant analogously calibrated just like $K_M$.

In FIG. 3, blocks COMP1 and COMP2 realize the mentioned comparisons, while block MUX realizes the selection operation.

The signal, which has been selected through the method of the invention, is sent to a conventional estimator based on the Gardner algorithm. The signal at the output of such estimator is, in turn, low-pass filtered and integrated (VCO) as in the usual synchronization technique.

Thus, the method for selecting the clock signal in a baseband combiner in accordance with the present invention comprises the step of driving the clock recovery circuit by one of said main signal $R_M(t)$, filtered and sampled, and said at least one diversity signal $R_D(t)$, filtered and sampled, and it is characterized in that the step of driving the clock recovery circuit by means of one or the other signal in turn comprises the steps of: calculating the average power $T_M$ of the equalized main signal $S_M(kT)$ and the average power $P_D$ of the at least one equalized diversity signal $S_D(kT)$; and driving the clock recovery circuit by means of the sampled signal $G_M(kT/2)$, $G_D(kT/2)$ selected on the basis of a comparison between the average powers of the signals $S_M(kT)$, $S_D(kT)$ at the output of the equalizers FSE.

The baseband combiner of a space-diversity receiver according to the present invention is characterized by comprising means, PWR, for calculating the average power $P_M$ of the equalized main signal $S_M(kT)$ and the average power $P_D$ of the at least one equalized diversity signal $S_D(kT)$, and means COMP1, COMP2 for performing the comparison between the average power values $P_M$, $P_D$, the clock recovery circuit being driven by means of the sampled signal $G_M(kT/2)$, $G_D(kT/2)$ selected on the basis of a comparison between the average powers of the signals $S_M(kT)$, $S_D(kT)$ at the output of the equalizers FSE.

There have thus been shown and described a novel method and a novel combiner which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for selecting a clock signal in a baseband combiner of a space-diversity receiver, said method comprising:
    driving a clock recovery circuit by means of one of a main signal, filtered and sampled, and at least one diversity signal, filtered and sampled, and
    equalizing said main and diversity signals;
    wherein the driving of said clock recovery circuit comprises:
    calculating the average power of the equalized main signal and the average power of the at least one equalized diversity signal, and
    driving the clock recovery circuit by means of the sampled signal chosen on the basis of a comparison between the average power of the main and diversity equalized signals.

2. A method according to claim 1, further comprising:
    providing a main positive constant;
    multiplying said main positive constant by the average power of the equalized main signal; and, in the instance where at the preceding time of processing the clock recovery circuit driving signal was the main signal, possibly filtered and sampled,
    driving the clock recovery circuit by means of said at least one diversity signal, possibly filtered and sampled, when the average power of the at least one equalized diversity signal is greater than the product of the main positive constant by the average power of the equalized main signal.

3. A method according to claim 1, further comprising:
    providing for a diversity positive constant;
    multiplying said diversity positive constant by the average power of the equalized diversity signal; and, in the instance where at the preceding time of processing, the signal that was driving the clock recovery circuit was the diversity signal, possibly filtered and sampled,
    driving the clock recovery circuit by means of said at least one main signal, possibly filtered and sampled, when the average power of the at least one equalized main signal is greater than the product of the diversity positive constant by the average power of the equalized diversity signal.

4. A baseband combiner of a space-diversity receiver, said combiner comprising:
    an input for a main signal;
    at least one additional input for a diversity signal;
    an equalizer receiving at its input said main signal, filtered and sampled, and outputting a corresponding equalized main signal;
    at least one corresponding additional equalizer receiving at its input said at least one diversity signal, filtered and sampled, and outputting a corresponding equalized diversity signal, and
    a clock recovery circuit, said clock recovery circuit being driven by one of said main signal, filtered and sampled, and said at least one diversity signal, filtered and sampled,
    wherein the combiner further comprises:
    means for calculating the average power of the equalized main signal and the average power of the at least one equalized diversity signal,
    means for performing the comparison between the average power values, the clock recovery circuit being driven by means of the sampled signal chosen on the basis of a comparison between the average power of the equalized signals.

5. A combiner according to claim 4, further comprising means for multiplying the average power values by respective positive constants and wherein said comparison means perform the comparison between the average power values and the products of the average powers by respective positive constants.

6. A combiner according to claim 5, further comprising selection means for selecting the driving signal according to the result of the comparison performed by the comparison means.

* * * * *